Nov. 4, 1924.
G. E. HAZARD ET AL
1,514,520
COMBINED GAUGE AND OUTLET
Filed Feb. 2, 1922
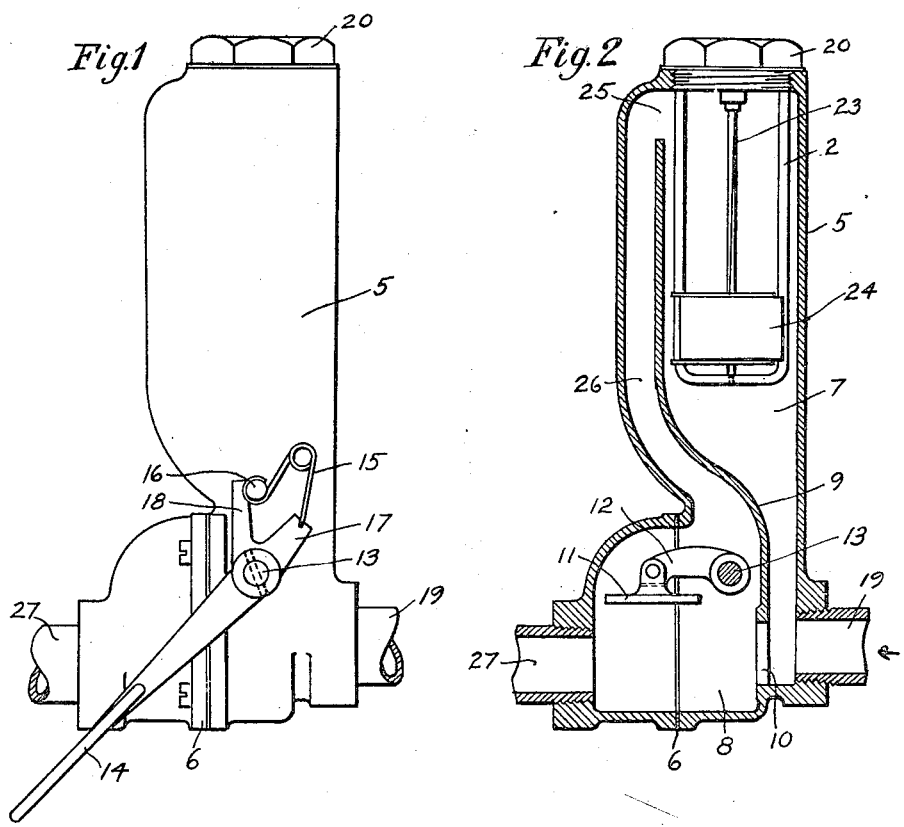
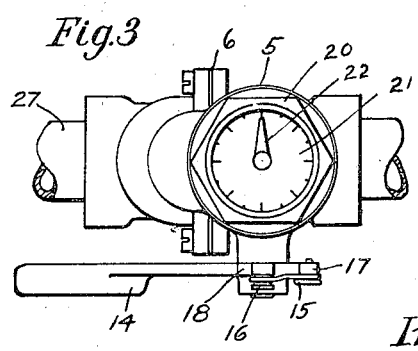
Inventors—
George E. Hazard
Harry F. Boe
by their attorney
Farnum F. Worsey Patented Nov. 4, 1924.

1,514,520

UNITED STATES PATENT OFFICE.

GEORGE EDGAR HAZARD AND HARRY F. BOE, OF ROCHESTER, NEW YORK.

COMBINED GAUGE AND OUTLET.

Application filed February 2, 1922. Serial No. 533,679.

*To all whom it may concern:*

Be it known that we, GEORGE E. HAZARD and HARRY F. BOE, citizens of the United States, residing at Rochester, in the county of Monroe and State of New York, have invented certain new and useful Improvements in Combined Gauges and Outlets; and we do hereby declare the following to be a full, clear, and exact description of the invention, such as will enable others skilled in the art to which it appertains to make and use the same.

This invention relates to an outlet-fitting suitable for washing-machines or the like, wherein it is desirable to maintain water or other liquid at a definite depth and also to draw off the liquid at intervals.

In a machine of the kind in question, in addition to the usual drain-valve, it is desirable to provide means for visually indicating the depth of liquid in the machine, and also an overflow to prevent the filling of the machine to a depth greater than that for which it is designed. The object of the present invention is to provide these several parts in a simple, inexpensive and convenient form, and to this end it is proposed to embody them all in a unitary assembly, in which the valve, the gauge and the overflow-passage are all enclosed in a single compact casing or body.

In the accompanying drawings Fig. 1 is a side-elevation of a device embodying the present invention. Fig. 2 is a vertical sectional view, and Fig. 3 a plan-view of the same device.

The invention is illustrated as embodied in a device comprising a casing 5, which is divided vertically and provided with a fluid-tight joint 6. Within the casing are two chambers, 7 and 8, separated by a partition 9.

An opening 10 at the bottom of the partition may be closed by a valve 11 constituting a drain-valve. This valve is carried by an arm 12 fixed on a rock-shaft 13 which extends to the outside of the casing. On the outer end of the rock-shaft is an arm 14 by which the rock-shaft may be turned to open or close the valve. A toggle-spring 15 is pivoted, at its respective ends, to a pin 16 projecting from the casing and to an arm 17 integral with the arm 14. This spring swings from one side to the other of the pin 16, and acts to hold the valve in either its closed position or its open position, as the case may be. An arm 18, also integral with the arm 14, engages the pin 16 to arrest movement of the parts when the valve is open, as shown.

The device may be connected with a washing-machine by an inlet-pipe 19 communicating with the chamber 7. The upper end of this chamber has a screw-threaded opening which is adapted to receive a plug 20, constituting a part of a gauge for indicating the depth of liquid. This gauge is shown as of a well-known type, in which there is a dial 21 at the top, and a pointer 22 which is attached to a vertical twisted rod 23, a float 24 being arranged to rotate the rod and the pointer as it rises or falls.

The chamber 7 thus constitutes a gauge-chamber, and it also constitutes the rising portion of an overflow, for it communicates, through an opening 25 at its upper end, with a descending passage 26 which is cored in the casting of which the casing is made. This passage 26 discharges into the valve-chamber 8.

From the valve-chamber the liquid flowing through the drain-opening 10 or through the overflow-passage is discharged freely through a drain-pipe 27.

When the washing-machine is to be used the valve 11 is closed and water may then be introduced into the machine from another source. The overflow-passage prevents the water from rising too high, but the gauge, by indicating when enough has been introduced, prevents waste, so that overflowing need not occur except through carelessness.

The embodiment of the valve, the gauge and the overflow in a single device saves material and expense, and eliminates numerous joints which might cause leakage and inconvenience.

The illustrated forms of the drain-valve and of the depth-gauge are not essential, but may be varied without departure from the invention.

The invention claimed is:

1. A combined gauge and outlet comprising: an elongated upright hollow body, divided, by an upright interior partition, into two passages, the partition having openings to provide communication between said passages at both top and bottom; a valve for normally closing the lower of said openings; and a fluid-gauge for indicating the depth of the fluid in one of said passages.

2. A combined gauge and outlet comprising: an integral, elongated, upright hollow body divided, by an upright integral interior partition, into a relatively wide passage and a relatively narrow passage, the partition having openings to provide communication between said passages at both top and bottom, and the body having a discharge-opening at the lower end of the relatively narrow passage, an inlet-opening at the lower end of the relatively wide passage, and an opening at the upper end of said wide passage; a depth-gauge working in said wide passage and mounted in the last-mentioned opening; and a valve for closing the lower opening in the partition.

GEORGE EDGAR HAZARD.
HARRY F. BOE.